United States Patent [19]

Finnson

[11] Patent Number: 5,700,022

[45] Date of Patent: Dec. 23, 1997

[54] MULTIFUNCTIONAL COLLAPSIBLE SHIELD

[76] Inventor: Lawrence M. Finnson, 9384 Odell Rd., Blaine, Wash. 98230

[21] Appl. No.: 581,848

[22] Filed: Jan. 2, 1996

[51] Int. Cl.⁶ .................................................. B62D 25/16
[52] U.S. Cl. ............................... 280/152.3; 280/852
[58] Field of Search ..................... 280/152.1, 152.3, 280/847, 852, 160, 160.1, 849

[56] References Cited

U.S. PATENT DOCUMENTS

| | | |
|---|---|---|
| 515,213 | 2/1894 | Griswold . |
| 544,935 | 8/1895 | Shone . |
| 558,337 | 4/1896 | Fox . |
| 573,282 | 12/1896 | McNaughton . |
| 606,359 | 6/1898 | Reid . |
| 741,997 | 10/1903 | Beckwith ........................ 280/152.3 |
| 750,386 | 1/1904 | Neinens et al. . |
| 868,461 | 10/1907 | Lockwood . |
| 2,522,072 | 9/1950 | Tierney, Jr. . |
| 2,585,054 | 2/1952 | Stachura . |
| 3,080,892 | 3/1963 | Plummer . |
| 3,138,859 | 6/1964 | Edwards . |
| 4,319,763 | 3/1982 | White . |
| 5,562,296 | 10/1996 | Hall et al. ....................... 280/152.1 X |

FOREIGN PATENT DOCUMENTS

| | | | |
|---|---|---|---|
| 1108664 | 9/1981 | Canada ............................ | 280/152.3 |
| 16472 | 8/1896 | United Kingdom ............ | 280/152.3 |
| 14261 | 7/1897 | United Kingdom ............ | 280/152.3 |

*Primary Examiner*—Brian L. Johnson
*Assistant Examiner*—Michael Mar
*Attorney, Agent, or Firm*—Michael I. Kroll

[57] ABSTRACT

A multifunctional collapsible shield (10) comprising an elongated sheet (12) and a pair of elongated panels (14). A facility (16) is for attaching each longitudinal edge of the elongated sheet (12) to the longitudinal center of each elongated panel (14). A component (18) is for joining opposite longitudinal edges of the elongated panels (14) together. The elongated sheet (12) in combination with the elongated panels (14) will form a structural tube (20) with outer portions of the elongated panels (14) extending away from the formed structural tube (20), to function as guard members.

9 Claims, 2 Drawing Sheets

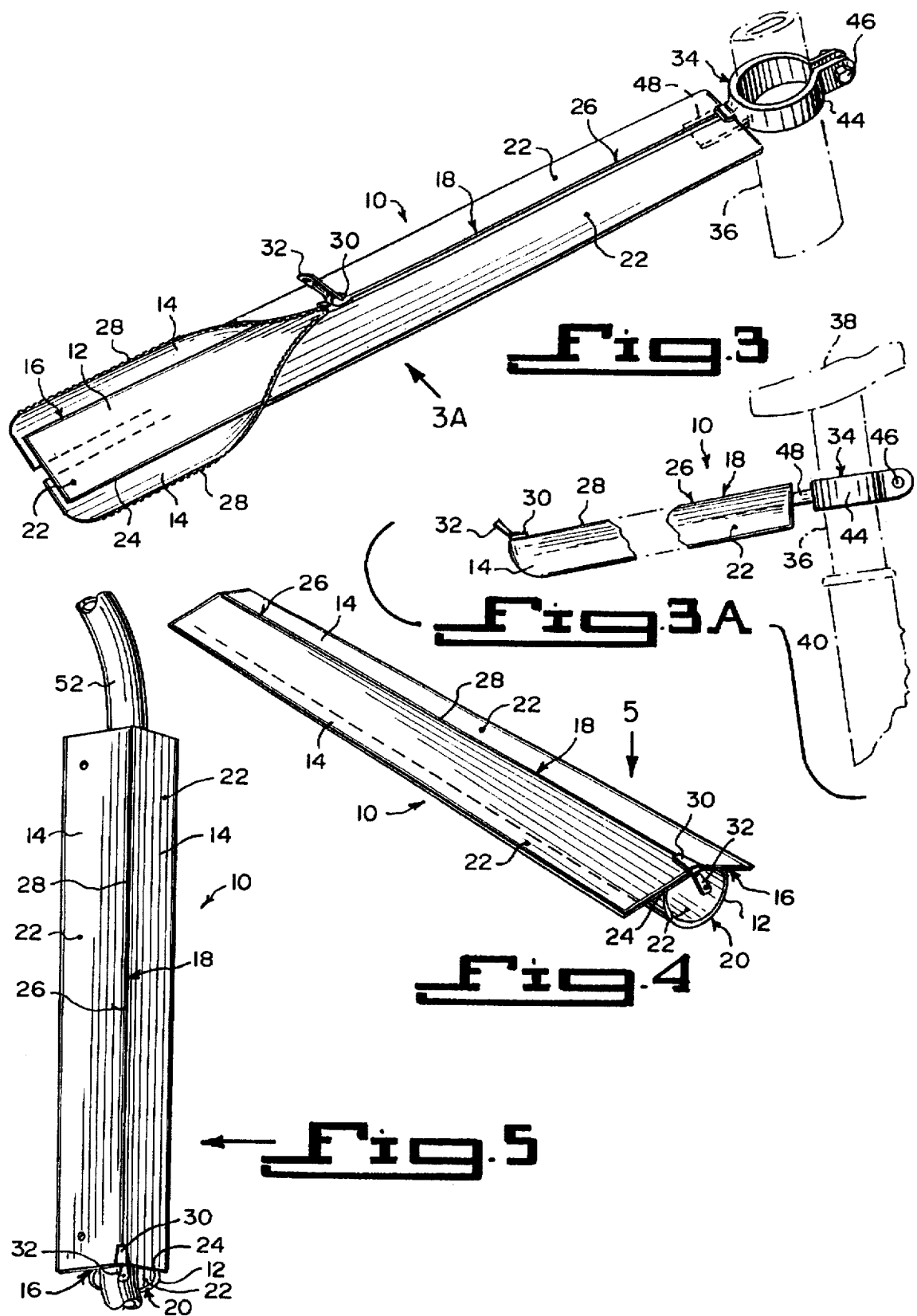

MULTIFUNCTIONAL COLLAPSIBLE SHIELD

BACKGROUND OF THE INVENTION

1. Field of the Invention

The instant invention relates generally to guard members and more specifically it relates to a multifunctional collapsible shield.

2. Description of the Prior Art

Numerous guard members have been provided in prior art. For example, U.S. Pat. Nos. 515,213 to Griswold; 544,935 to Shone; 558,377 to Fox; 573,282 to McNaughton; 606,359 to Reid; 750,386 to Neinens et al.; 868,461 to Lockwood; 2,522,072 to Tierney, Jr.; 2,585,054 to Stachura; 3,080,892 to Plummer; 3,138,859 to Edwards and 4,319,763 to White all are illustrative of such prior art. While these units may be suitable for the particular purpose to which they address, they would not be as suitable for the purposes of the present invention as heretofore described.

GRISWOLD, MARIUS E.

MUD GUARD FOR BICYCLES

U.S. Pat. No. 515,213

The patent shows a mud guard in the form of a collapsible band, which is attached between a rear bracket and a frame member adjacent to a seat.

SHORE, JAMES W.

MUD GUARD FOR BICYCLES

U.S. Pat. No. 544,935

The patent shows a mud guard in the form of a web, which is attached to an upright bar above a rear wheel and extends forwardly to a seat and then downwardly to the location of the pedals.

FOX, ADAM F.

FOLDABLE MUD GUARD

U.S. Pat. No. 558,377

The patent shows a foldable mud guard, which employs a rigid support system and a stretched fabric panel.

MCNAUGHTON, JOHN G.

BICYCLE ATTACHMENT

U.S. Pat. No. 573,282

The patent shows a mud guard for a bicycle where it is in the form of a bird of prey, whose wings act as mud guards when opened and held in place by springs.

REID, RANDOLPH H.

MUD GUARD

U.S. Pat. No. 606,359

The patent shows a mud guard which can be rolled up on a roller and then extended to a protecting position.

NEINENS, JACOB

KLEINBIELEN, HUBERT

MUD GUARD FOR CYCLES

U.S. Pat. No. 750,386

The patent shows an extendable mud guard where the mud guard elements telescope.

LOCKWOOD, JAMES B.

GUARD FOR BICYCLES

U.S. Pat. No. 868,461

The patent shows an extendable mud guard which appears to be in the form of a strap, which can be rolled up under a seat and then extended and attached to a bracket.

TIERNEY, JR., SAMUEL

ELECTRICAL SHIELD WITH SLIDE FASTENER

U.S. Pat. No. 2,522,072

The patent shows a zipper used in conjunction with an internal support structure to create an electrical shield.

STACHURA, EDWARD J.

FLEXIBLE SHIELD FOR ELECTRIC CONDUCTORS

U.S. Pat. No. 2,585,054

The patent shows the use of a zipper to create a self-supporting cylindrical housing for electrical conductive wires or the like.

PLUMMER, WALTER A.

WIRE HARNESS HAVING PROVISION FOR BRANCHOUTS

U.S. Pat. No. 3,080,892

The patent shows a tapered tube that is formed into a tube configuration by means of a zipper.

EDWARDS, H. ROBERT

METHOD OF ASSEMBLING CABLING IN INFLATABLE SEAMLESS TUBING

U.S. Pat. No. 3,138,859

The patent simply shows a jacket which encircles a cable. A zipper is used to close the jacket.

WHITE, STOUGHTON K.

COLLAPSIBLE LIGHTWEIGHT BICYCLE FENDERS AND METHOD OF ATTACHING FENDERS TO THE BICYCLE FRAME

U.S. Pat. No. 4,319,763

The patent shows two somewhat flexible plastic pieces which can be folded into a compact configuration and then expanded and attached to each other end to end with a small amount of overlap to form a fender.

SUMMARY OF THE INVENTION

A primary object of the present invention is to provide a multifunctional collapsible shield that will overcome the shortcomings of the prior art devices.

Another object is to provide a multifunctional collapsible shield that can be unrolled and zipped up by a longitudinal zipper, for form itself into a ridged tube with guard portions extending outwardly from the tube.

An additional object is to provide a multifunctional collapsible shield that can be used as an extendable fender on a bicycle, as a carrier and protector for air hoses, water hoses or wires in buildings along walls or on a floor, as a repellent for slugs when filled with salt, as a semi-ridged pour spout for a water line, as a water drain line, as a semi-rigid pipe when pumping air or sucking air, smoke or fumes out of a building or other space.

A further object is to provide a multifunctional collapsible shield that is simple and easy to use.

A still further object is to provide a multifunctional collapsible shield that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a further enlarged perspective view the instant invention in the extended position as the rear fender with the zipper partly opened and the seat post in phantom.

FIG. 3A is a side view taken in the direction of arrow 3A in FIG. 3 with parts broken away and the zipper completely closed.

FIG. 4 is a perspective view of the instant invention per se with the zipper closed.

FIG. 5 is a top view taken in the direction of arrow 5 in FIG. 4, showing the instant invention functioning as a carrier and protector for a cable or hose.

Similar reference characters denote corresponding features consistently throughout the attached drawings.

DETAILED DESCRIPTION OF THE PREFERRED EMBODIMENTS

Figure 1:
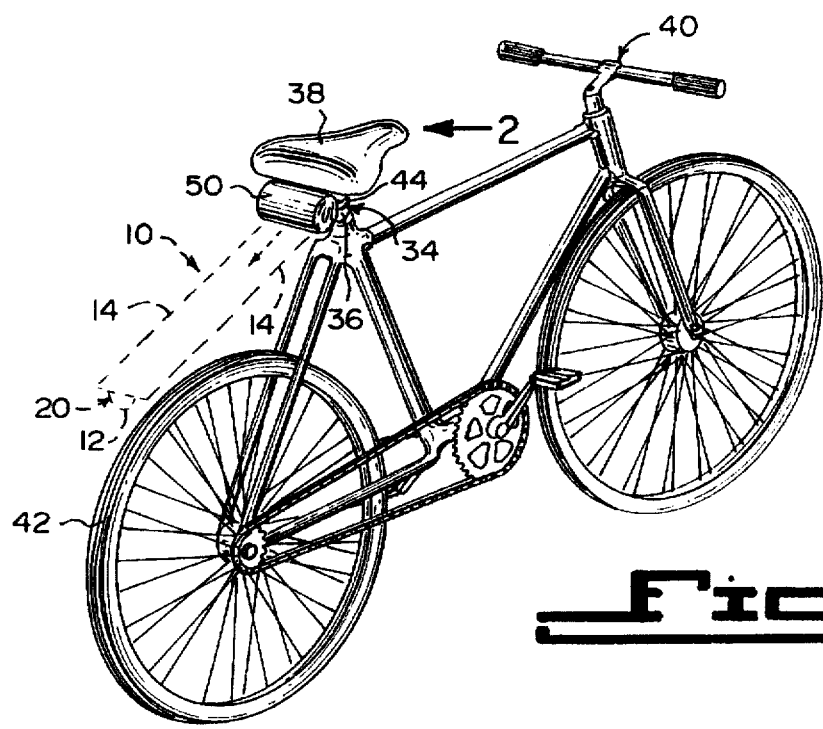
FIG. 1 is a perspective view of a bicycle, showing the instant invention in the stowed position and in phantom in the extended position, functioning as a rear fender.

Turning now descriptively to the drawings, in which similar reference characters denote similar elements throughout the several views, FIGS. 1 through 5 illustrate a multifunctional collapsible shield 10, comprising an elongated sheet 12 and a pair of elongated panels 14. A facility 16 is for attaching each longitudinal edge of the elongated sheet 12 to the longitudinal center of each elongated panel 14. A component 18 is for joining opposite longitudinal edges of the elongated panels 14 together. The elongated sheet 12 in combination with the elongated panels 14 will form a structural tube 20 with outer portions of the elongated panels 14 extending away from the formed structural tube 20, to function as guard members.

The elongated sheet 12 and each of the elongated panels 14 are fabricated out of a flexible durable material 22. The flexible durable material 22 is lightweight plastic.

The attaching facility 16 is a heat seal 24 between each longitudinal edge of the elongated sheet 12 and the longitudinal center of each elongated panel 14. The joining component 18 is a zipper 26. The zipper 26 includes two rows of teeth 28 on the opposite longitudinal edges of the elongated panels 14. A sliding piece 30 with pull tab 32 will close an opening between the opposite longitudinal edges of the elongated panels 14 by interlocking the teeth 28 together.

Figure 2:
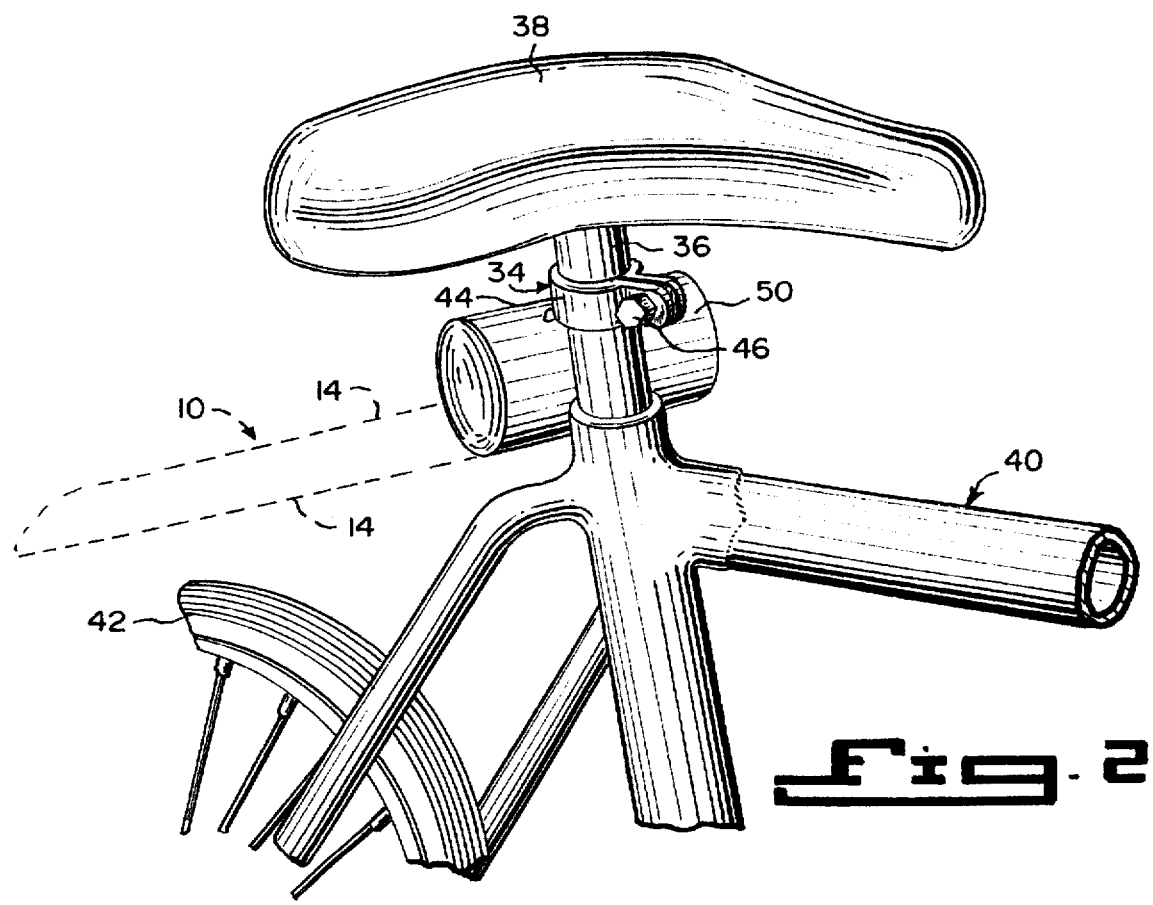
FIG. 2 is an enlarged perspective view with parts broken away taken in the direction of arrow 2 in FIG. 1.

The multifunctional collapsible shield 10 can further include an element 34, for securing one end of the formed structural tube 20 to a seat post 36 of a seat 38 on a bicycle 40, so that the formed structural tube 20 can be extended over a rear wheel 42 of the bicycle 40, to act as a fender. The securing element 34 consists of a collar grip clamp 44 to fit about the seat post 36. A locking bolt 46 is on the collar grip clamp 44, to hold the collar grip clamp 44 tightly to the seat post 36. A tongue 48 on the collar grip clamp 44 is to engage with the one end of the formed structural tube 20, for supporting the formed structural tube 20 over the rear wheel 42 of the bicycle 40. A pouch 50, as shown in FIGS. 1 and 2, is to retain the elongated sheet 12 and the elongated panels 14 of the formed structural tube 20 when rolled up under the seat 38, after the joining component 18 is completely opened.

OPERATION OF THE INVENTION

The multifunctional collapsible shield 10 can be used in the following ways:

1. As an extendable fender on the bicycle 40 and stowed in the pouch 50 under the bicycle seat 38 when not in use, as shown in FIGS. 1 through 3A.
2. As a carrier and protector for air hoses, water hoses or wires 52, along walls or on a floor in a shop or building, as shown in FIG. 5.
3. As a repellant for slugs when the formed structural tube 20 is filled with salt and laid around a perimeter of a garden.
4. As a semi-ridged pour spout for a water line.
5. As a water drain line.
6. As a semi-ridged pipe when pumping air or sucking air, smoke or fumes out of a building or other space.
7. As a temporary cover for any item where a solid or heavy cover is undesirable.

LIST OF REFERENCE NUMBERS

| | |
|---|---|
| 10 | multifunctional collapsible shield |
| 12 | elongated sheet of 10 |
| 14 | elongated panel of 10 |
| 16 | attaching facility of 10 |
| 18 | joining component of 10 |
| 20 | formed structural tube |
| 22 | flexible durable material |
| 24 | heat seal for 16 |
| 26 | zipper for 18 |
| 28 | tooth of 26 |
| 30 | sliding piece of 26 |
| 32 | pull tab on 30 |
| 34 | securing element of 10 |
| 36 | seat post of 38 |
| 38 | seat of 40 |
| 40 | bicycle |
| 42 | rear wheel of 40 |
| 44 | collar grip clamp of 34 |
| 46 | locking bolt of 34 |
| 48 | tongue of 34 |
| 50 | pouch of 10 |
| 52 | air hose, water hose or wire |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multifunctional collapsible shield comprising:
   a) an elongated sheet having opposed longitudinal edges;
   b) a pair of elongated panels, each elongated panel having inner and outer longitudinal portions with a longitudinal center therebetween;
   c) means for attaching each longitudinal edge of said elongated sheet to the longitudinal center of each said elongated panel;
   d) a zipper attached to opposite longitudinal edges of the inner portions of said pair of elongated panels, the inner portions being joined together and the elongated sheet being deformed along it's longitudinal length when the zipper is closed so that the elongated sheet in combination with the inner portions form a structural tube with the outer portions of the elongated panels extending away from the formed structural robe to function as guard members, and the inner portions being separated when the zipper is opened to permit the elongated sheet and the longitudinal panels to assume a rolled configuration; and
   e) means for securing a forward end of the formed structural tube to a seat post of a seat on a bicycle, said formed structural tube being sufficiently rigid when the zipper is closed to permit a rearward end portion of the formed structural tube to extend unsupported over a rear wheel of the bicycle to act as a fender.

2. A multifunctional collapsible shield as recited in claim 1, wherein said elongated sheet is fabricated out of a flexible durable material.

3. A multifunctional collapsible shield as recited in claim 2, wherein said flexible durable material is lightweight plastic.

4. A multifunctional collapsible shield as recited in claim 1, wherein each of said elongated panels is fabricated out of a flexible durable material.

5. A multifunctional collapsible shield as recited in claim 4, wherein said flexible durable material is lightweight plastic.

6. A multifunctional collapsible shield as recited in claim 1, wherein said attaching means is a heat seal between each longitudinal edge of said elongated sheet and the longitudinal center of each said elongated panel.

7. A multifunctional collapsible sheet as recited in claim 1, wherein said zipper includes:
   a) two rows of teeth on the opposite longitudinal edges of said elongated panels; and
   b) a sliding piece with pull tab that will close an opening between the opposite longitudinal edges of said elongated panels by interlocking said teeth together.

8. A multifunctional collapsible shield as recited in claim 1, wherein said securing means includes:
   a) a collar grip clamp to fit about the seat post;
   b) a locking bolt on said collar grip clamp to hold said collar grip clamp tightly to the seat post; and
   c) a tongue on said collar grip clamp to engage with the one end of said formed structural tube, for supporting said formed structural tube over the rear wheel of the bicycle.

9. A multifunctional collapsible shield as recited in claim 8, further including a pouch to retain said elongated sheet and said elongated panels when in the rolled configuration.

* * * * *